(12) United States Patent
Ghiringhelli et al.

(10) Patent No.: US 11,988,587 B2
(45) Date of Patent: May 21, 2024

(54) ROTARY ASSEMBLY WITH MAGNETIC BEARING

(71) Applicant: RHEONOVA, Grenoble (FR)

(72) Inventors: Etienne Ghiringhelli, Saint Laurent d'Onay (FR); Jeremy Patarin, Grenoble (FR); Didier Bleses, Crolles (FR)

(73) Assignee: RHEONOVA, Grenoble (FR)

( * ) Notice: Subject to any disclaimer, the term of this patent is extended or adjusted under 35 U.S.C. 154(b) by 151 days.

(21) Appl. No.: 16/956,428

(22) PCT Filed: Dec. 21, 2018

(86) PCT No.: PCT/FR2018/053520
§ 371 (c)(1),
(2) Date: Jun. 19, 2020

(87) PCT Pub. No.: WO2019/122785
PCT Pub. Date: Jun. 27, 2019

(65) Prior Publication Data
US 2021/0102878 A1    Apr. 8, 2021

(30) Foreign Application Priority Data
Dec. 22, 2017   (FR) ...................... 1763153

(51) Int. Cl.
*F16C 32/04*    (2006.01)
*G01N 11/14*    (2006.01)
*H02K 7/09*    (2006.01)

(52) U.S. Cl.
CPC .......... *G01N 11/14* (2013.01); *F16C 32/0414* (2013.01); *F16C 32/047* (2013.01);
(Continued)

(58) Field of Classification Search
CPC ... G01N 11/14; F16C 32/0414; F16C 32/047; F16C 32/048; F16C 2370/00; H02K 7/09
See application file for complete search history.

(56) References Cited

U.S. PATENT DOCUMENTS 4,080,012 A    3/1978  Boden et al.
6,218,751 B1 *  4/2001  Bohlin .................. G01N 11/14
                                                  310/91
(Continued)

FOREIGN PATENT DOCUMENTS

DE    3437937 A  *  8/1985  .......... F16C 32/0429
EP    0983450 B1    8/2004

OTHER PUBLICATIONS

DE3437937A1 English translation (Year: 2023).*
(Continued)

*Primary Examiner* — Christopher M Koehler
*Assistant Examiner* — Viswanathan Subramanian
(74) *Attorney, Agent, or Firm* — WOMBLE BOND DICKINSON (US) LLP

(57) ABSTRACT

The present invention relates to a rotary assembly (1), in particular for a rheological measurement apparatus, comprising:
 a stator (3),
 a rotor (2) that can rotate with respect to the stator (3), the rotor (2) being axially retained by an axial retaining means (4) preventing the movement of the rotor (2) along the axis of rotation (A) thereof, the axial retaining means (4) comprising a flexible rod suitable for being attached to a frame (5) and which allows a radial movement of the rotor (2),
 a magnetic bearing comprising a rotor element (6) made of magnetic material mounted on the rotor (2) and a stator element (7) made of magnetic material mounted
(Continued)

on the stator (3), at least one of the rotor and stator elements made of magnetic material being a spherical magnet, wherein the rotary assembly (1) has a stable position in which the rotor (2) is aligned with the axis of rotation (A) thereof, and the elements made of magnetic material are facing each other along the axis of rotation (A) of the rotor and are separated from each other by a given distance (M), and wherein the elements made of magnetic material are configured to attract each other, so as to generate a return force which opposes the axial misalignment of said rotor (2).

The invention also relates to a rheological measurement apparatus comprising at least one such rotary assembly (1).

17 Claims, 7 Drawing Sheets

(52) U.S. Cl.
CPC ............. *F16C 32/048* (2013.01); *H02K 7/09* (2013.01); *F16C 2370/00* (2013.01)

(56) References Cited

U.S. PATENT DOCUMENTS

| 2003/0020346 A1* | 1/2003 | Ichiyama ............. F16C 33/107 |
| | | 310/90 |
| 2005/0035670 A1* | 2/2005 | Chen ...................... F16C 17/08 |
| | | 310/10 |
| 2005/0184609 A1 | 8/2005 | Chen et al. |

OTHER PUBLICATIONS

International Preliminary Report on Patentability received for PCT Patent Application No. PCT/FR2018/053520, dated Jul. 2, 2020, 16 pages (9 pages of English Translation and 7 pages of Original Document).

International Search Report and Written Opinion received for PCT Patent Application No. PCT/FR2018/053520, dated Mar. 11, 2019, 18 pages (9 pages of English Translation and 9 pages of Original Document).

Preliminary Research Report received for French Application No. 1763153, dated Jul. 16, 2018, 3 pages (1 page of French Translation Cover Sheet and 2 pages of original document).

\* cited by examiner

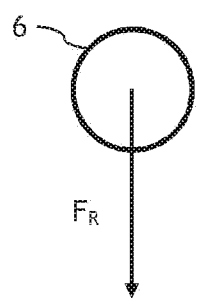
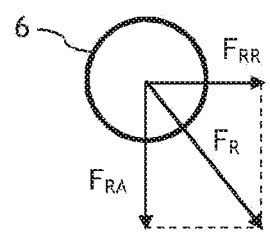
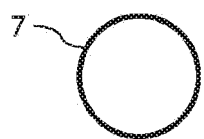
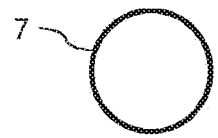
FIGURE 3A              FIGURE 3B

ROTARY ASSEMBLY WITH MAGNETIC BEARING

FIELD OF THE INVENTION

The present invention relates to the field of rotary assemblies with magnetic bearings that have a rotor portion mobile in relation to a fixed stator portion. The present invention also relates to an apparatus, especially a rheological measurement apparatus, comprising such a rotary assembly.

PRIOR ART

A bearing makes it possible to retain a mobile portion, designated as a "rotor", in the axis thereof while still allowing for a rotation of the latter in relation to a fixed portion, designated as a "stator".

There are two main categories of bearings for rotary assembly, namely mechanical bearings wherein the rotor is retained in the axis of rotation thereof by mechanical means, and magnetic bearings wherein the rotor is retained in the axis of rotation thereof by magnetic parts that have the form of magnets.

The advantage of a magnetic bearing with respect to a mechanical bearing resides in the fact that the magnetic bearing makes it possible to retain the rotor in the axis thereof during the rotation thereof while preventing any mechanical friction. On the other hand, generally, for a magnetic bearing the retaining of the rotor in the axis thereof is less precise than a mechanical bearing, since the latter allows for a deflection of the rotor relative to the axis of rotation thereof, and is therefore mainly used for applications that do not require the rotor to be mechanically constrained in the axis of rotation thereof, but nevertheless requiring an absence of friction. It can for example be used by being coupled to an embedded torsion bar at an end of the rotor in order to axially retain the rotor, so as to measure a torque without friction.

Conventionally, magnetic bearings use toroidal magnets, i.e. magnets that have the form of a torus that encircles a portion of the rotor and a portion of the stator substantially facing each other. Document EP0983450 describes on this subject a magnetic bearing wherein a rotor is connected to a stator by axial retaining means, and comprises toroidal magnets at each one of the ends thereof. The stator also comprises toroidal magnets, substantially facing magnets of the rotor and axially offset with respect to the latter. The magnets of the rotor and the magnets of the stator are configured so as to repel each other. Thus, the repulsive force of the rotor and stator magnets tend to move the rotor axially, combined with the axial retaining means which opposes the axial movement of the rotor, makes it possible to retain the rotor in the axis thereof during the rotation thereof.

A disadvantage of the magnetic bearing of document EP0983450 resides in the fact that the repulsive force between the magnets of the rotor and of the stator is at a minimum when the rotor is centred in the ideal position thereof, and increases when the rotor moves away. It would on the contrary be preferable that the force be maximal at the centre so as to guarantee the stability of the bearing. Indeed, when it is desired to maximise the return force of this bearing, an unstable position is approached that tends to destabilise the bearing. The rotor is regularly led to come out of the axis thereof during the rotation thereof before being brought back into its axis by the repulsive force that increases with the moving away of the rotor from its axis.

Another disadvantage of this magnetic bearing resides in the difficulty in changing the parts which form the rotary assembly. To change a part, it is indeed necessary to disassemble the rotor by disconnecting it from the axial retaining means, then by sliding it along the inner wall of the stator. These steps are long and laborious, all the more so that once the rotary assembly has been reassembled, it is necessary to again adjust the positioning of the magnets of the magnetic bearing along the rotor and stator respectively.

Such a magnetic bearing also has the disadvantage of being sensitive to resonance. Indeed, for oscillations and/or at rotation speeds of the rotor that are medium to high, the rotor in rotation oscillates at a certain frequency which can be led to correspond to a resonance frequency or frequencies of the rotary assembly. The rotor then resonates, and even risks coming out of the axis of rotation thereof, which results in an incorrect measurement when the rotary assembly is used to take a measurement, for example a measurement of movement or of torque. This is especially constraining in the case where a precise oscillation of the rotor is imposed in order to carry out a given method, and the oscillation frequency imposed also corresponds to a resonance frequency of the rotary assembly.

DISCLOSURE OF THE INVENTION

The invention therefore has for purpose to overcome the disadvantages of the prior art by proposing a rotary assembly provided with a magnetic bearing that makes it possible to retain in a stable manner the rotor of the rotary assembly in the axis of rotation thereof, in particular close to the position that allows for the most rigid adjusting of the magnetic bearing, i.e. the position for which the return force in the axis is maximal.

For this purpose, according to a first aspect, the invention proposes a rotary assembly, in particular for a rheological measurement apparatus, comprising:
  a stator,
  a rotor rotatable with respect to the stator, the rotor being
    axially retained by axial retaining means preventing the
    movement of the rotor along the axis of rotation
    thereof, the axial retaining means comprising a flexible
    rod suitable for being attached to a frame and which
    allows a radial movement of the rotor,
  a magnetic bearing comprising a rotor element made of
    magnetic material mounted on the rotor and a stator
    element made of magnetic material mounted on the
    stator, at least one of the rotor and stator elements made
    of magnetic material being a spherical magnet,
  wherein the rotary assembly has a stable position in which the rotor is aligned with the axis of rotation thereof, and the elements made of magnetic material are facing each other along the axis of rotation of the rotor and are separated from each other by a given distance, and wherein the elements made of magnetic material are configured to attract each other, so as to generate a return force which opposes the axial misalignment of said rotor.

Thus, the stable position of the rotary assembly is a balanced position wherein, for a given axial distance between the rotor element made of magnetic material and the stator element made of magnetic material, the return force of the rotor towards the axis thereof is at a maximum. In this stable position, the rotary assembly operates optimally and then tends to remain in this position when it is in operation.

The term "magnet" means a permanent magnet or an electromagnet.

The "element made of magnetic material" or simply "magnetic element" means an element that is able to interact with the magnetic field of a magnet such as defined hereinabove in such a way as to be attracted by said magnet. Such a magnetic element can be made of iron, nickel, cobalt, or chromium for example. It can have a diverse shape, such as a plate, cylinder, cube, sphere, or any other shape suitable for the use thereof within the rotary assembly. In particular, such an element made of magnetic material can be a magnet such as defined hereinabove.

The term "magnetic element" defined hereinabove relates to a single magnetic element or to a plurality of magnetic elements, and where applicable, to a single magnet or to a plurality of magnets.

According to other aspects, the rotary assembly proposed has the following different characteristics taken individually or according to the technically permissible combinations thereof:
- the rotor element made of magnetic material and the stator element made of magnetic material each comprise a magnet. In this way, both the element made of magnetic material of the rotor and the element made of magnetic material of the stator exert a magnetic attraction on each other, and therefore mutually attract each other, which increases the return force of the rotor and further stabilises the magnetic bearing.
- the rotor element made of magnetic material and the stator element made of magnetic material are aligned along the axis of rotation of the rotor when the rotary assembly is in a stable position;
- the element made of magnetic material of the rotor and the element made of magnetic material of the stator are advantageously of spherical shape. Indeed the shape of the elements made of magnetic material influences the possibilities of adjusting the distance that separates them. As described in the rest of the text, it is observed that a spherical geometry makes it possible to further minimise the distance between the elements made of magnetic material when the rotary assembly is in a stable position, compared to a cylindrical geometry for example. Indeed, in the case of a non-spherical geometry, in particular cylindrical, a distance that is too low induces a risk of misalignment of the rotor in rotation and blocking of the bearing, while there is no risk of misalignment of the rotor when at least one of the rotor and/or stator elements made of magnetic material is spherical. Then, the magnetic interactions between the elements made of magnetic material are maximised regardless of their relative position in relation to one another, which thus makes it possible to maximise the return force of the rotor;
- the rotor element made of magnetic material and/or the stator element made of magnetic material are permanent magnets;
- the rotor element made of magnetic material and/or the stator element made of magnetic material are electromagnets;
- the rotor and stator elements made of magnetic material each form a magnetic dipole, and wherein, when the rotor is in a stable position, the rotor and stator magnetic dipoles are aligned with each other along the axis of the rotor and are oriented in the same direction in such a way as to attract each other;
- the rotor comprises a head connected to the axial retaining means, a base arranged facing the head, and an intermediate portion which joins the head of the rotor to its base, the head, the base, and the intermediate portion delimiting a rotor air gap suitable for receiving a stator functional portion which is provided with the stator element made of magnetic material, the rotor element made of magnetic material and the stator functional portion element made of magnetic material being aligned with the axis of the rotor when the rotary assembly is in a stable position. The functional portion is designated as such because it comprises the stator magnetic element, and interacts magnetically with the rotor magnetic element, in opposition to the rest of the stator that extends outside the air gap. The functional portion is in particular an end of the stator when the stator has an extended shape, of which the length is long with respect to the width. Similarly, the portion of the rotor that interacts magnetically with the stator magnetic element is designated as functional portion of the rotor;
- the stator preferably extends substantially orthogonally to the axis of the rotor. This orthogonal arrangement optimises the space around the magnetic bearing and simplifies the structure thereof. An oblique arrangement of the stator in relation to the rotor does not however leave the scope of the invention;
- the determined distance can be adjusted by adjusting the axial position of the functional portion of the stator in the air gap of the rotor. The determined distance is minimal when the rotary assembly is in a stable position, which maximises the return force and guarantees the stability of the rotary assembly;
- Preferably, the magnetic bearing is passive, i.e. it does not require any external energy supply, and operates solely thanks to permanent interaction forces between the rotor and stator elements made of magnetic material. This can be a magnetic bearing with permanent magnets or a magnetic bearing with variable reluctance. Such a passive magnetic bearing has the advantage of having a particularly low cost, in particular lower than an active magnetic bearing.

According to a second aspect, the invention proposes a rheological measurement apparatus for taking a rheology measurement, comprising at least one rotary assembly such as described hereinabove.

DESCRIPTION OF THE FIGURES

Other advantages and characteristics of the invention will appear when reading the following description given for the purpose of information and in a non-limiting manner, in reference to the accompanying Figures that show:

FIGS. 3A and 3B, schematic layouts showing the action of the return force on the rotor of the rotary assembly of FIG. 1;

DETAILED DESCRIPTION OF THE INVENTION

The magnetic bearing of the rotary assembly described in the present text makes it possible to retain a rotor in the axis of rotation thereof, in particular when the rotor rotates on itself around its axis.

The magnetic bearing described is preferably that of a rotary assembly of an apparatus that makes it possible to take rheology measurements. It can very particularly be a rheometer or a viscosimeter for example. However, the invention is not limited to this single application.

Figure 1:
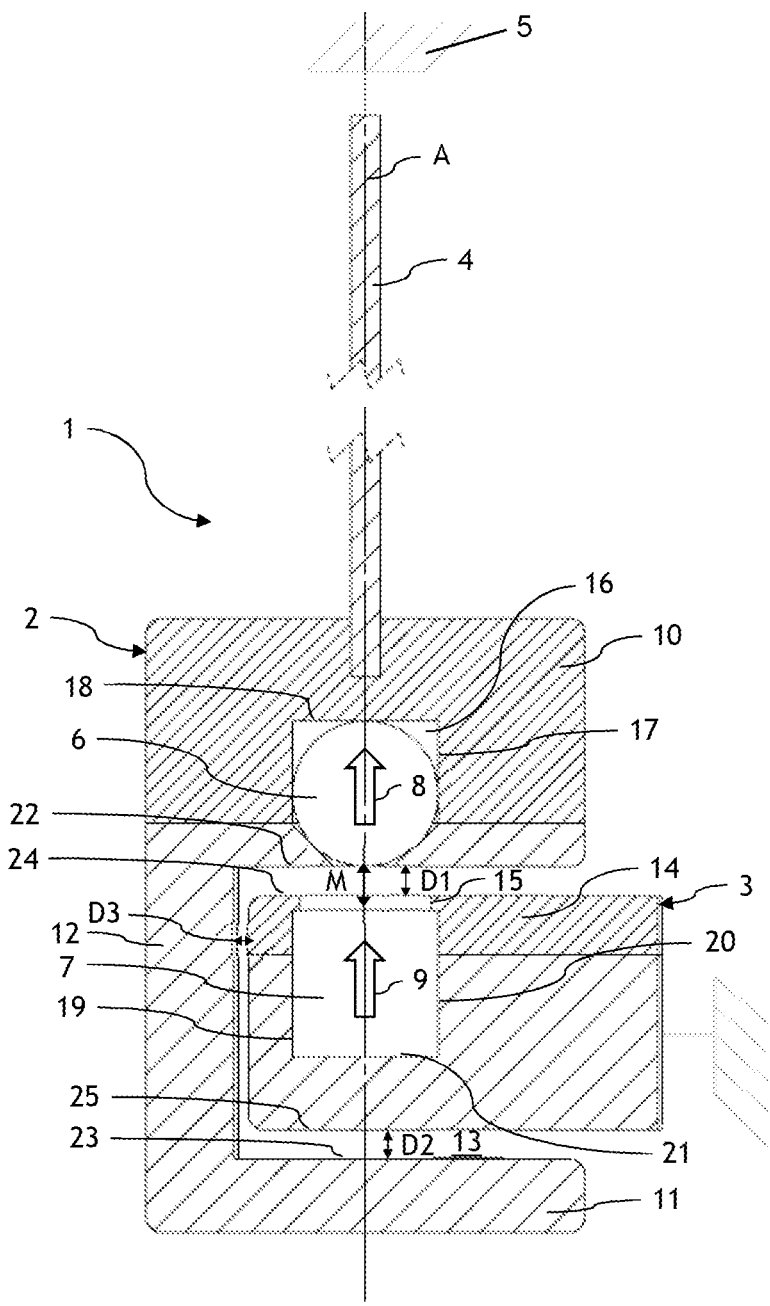
FIG. 1, a cross-section view of a rotary assembly in a stable position according to an embodiment, comprising a magnetic bearing provided with a rotor magnetic element and with a stator magnetic element.
Figure 2:
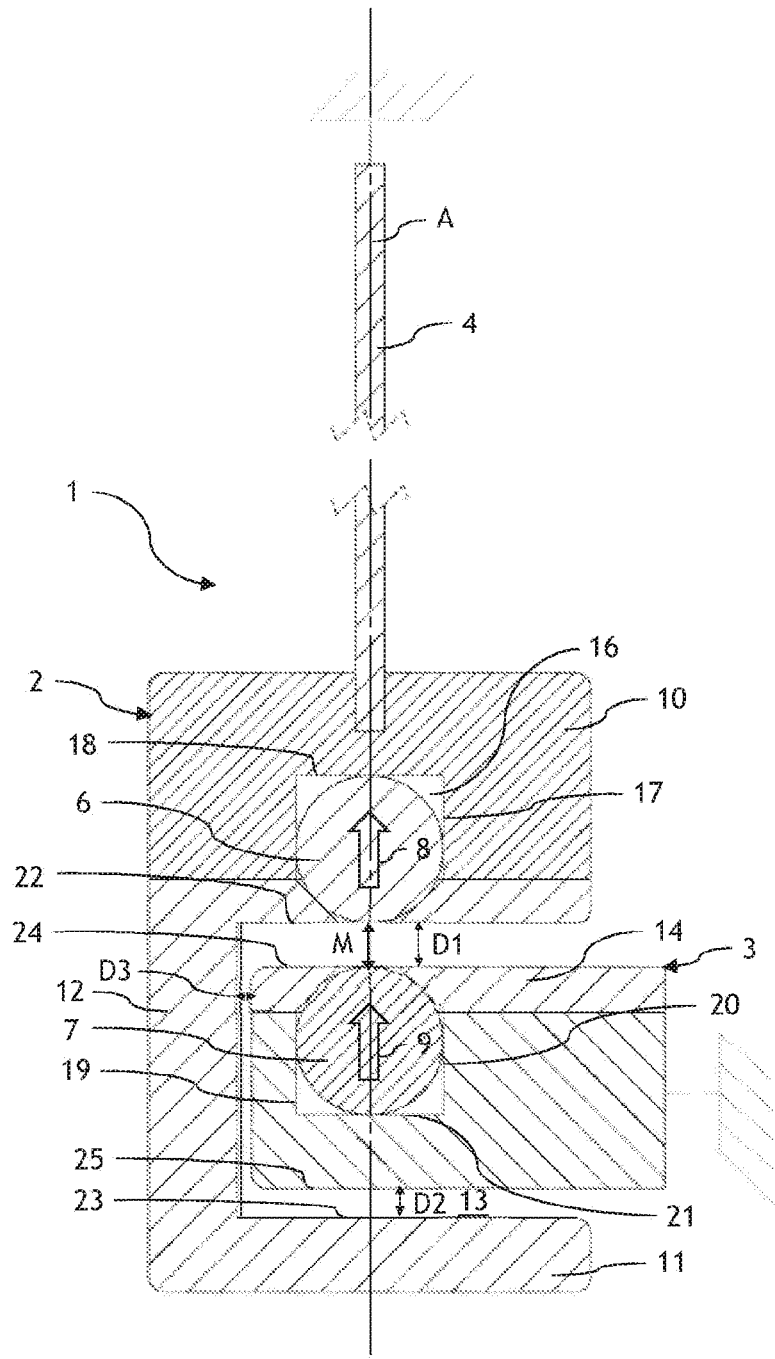
FIG. 2, a cross-section view of a rotary assembly similar to that of FIG. 1 according to another embodiment, wherein the rotor and stator magnetic elements are spherical.

FIGS. 1 and 2 show embodiments of a rotary assembly 1 according to the invention, wherein said rotary assembly is in a so-called "stable position". The rotary assembly 1 tends to remain in this stable position when it is operating, i.e. when the rotor 2 is rotating about its axis A, and is by default in this position when it is stopped, i.e. when the rotor 2 is immobile.

The description that follows is given relative to a rotary assembly 1 that is in a stable position. It is of course understood that the arrangement and behaviour of the constituting elements thereof are able to vary at least slightly during the operation thereof, with the rotation of the rotor.

The rotor 2 is connected to a frame 5 by axial retaining means 4 attached to the rotor and to the frame. Preferably, the axial retaining means 4 is embedded into the frame 5.

The axial retaining means 4 advantageously has the form of a rod aligned with the axis of rotation A of the rotor 2. The axial retaining means 4 thus prevent the movement of the rotor 2 along the axis A, namely upwards and downwards in the case of a common use of the rotary assembly 1 according to which the axis of rotation A of the rotor is substantially vertical and orthogonal with respect to the plane of the support of the rotary assembly.

The axial retaining means 4 undergoes a torsion force when the rotor 2 is rotating about its axis, which makes it possible to measure a torque.

However, the axial retaining means 4 has a certain flexibility.

Thus, as with any magnetic bearing, the rotor can accept a misalignment in relation to the stator.

The attachment of the flexible axial retaining means 4 to the frame 5, in particular by embedding, thus creates an axial abutment of the rotor 2, while still removing the friction caused by the radial movement of said rotor.

According to these embodiments, the rotor 2 comprises a head 10 connected to the axial retaining means 4, a base 11 arranged facing the head 10, and an intermediate portion 12 that extends parallel to the axis A of the rotor and joining the head 10 of the rotor to its base 11. The head 10 of the rotor, the base 11 thereof, and the intermediate portion 12 delimit any empty space 13, designated by the term "rotor air gap" configured to receive a functional portion of the stator that intercepts the rotor axis A. In a non-limiting manner, the stator 3 extends here in a radial direction, i.e. substantially orthogonally to the axis A of the rotor.

In accordance with the embodiment shown in FIGS. 1 and 2, the rotor 2 and the stator 3 each include an element made of magnetic material 6, 7 of which the arrangement as well as their magnetic interaction contribute to the stability of the rotary assembly 1. For this purpose, the elements made of magnetic material 6, 7 are positioned facing each other according to the axis A of rotation of the rotor. They can be aligned according to the axis A of rotation of the rotor.

The rotor and stator functional portions can include magnetic elements of diverse shapes. These magnetic elements can be magnets, or simply be parts that can interact with the magnetic field of a magnet without however having the magnetic attraction properties of a magnet. In particular, only one of the rotor and stator magnetic elements can comprise a magnet while the other comprises a magnetic element that is not a magnet, or the rotor and stator magnetic elements can both comprise a magnet. It is however still necessary that one of the magnetic elements generate a magnetic field able to attract the other magnetic element, and therefore that at least the rotor or stator magnetic element comprise a magnet.

In accordance with the embodiment shown in FIG. 1, the rotor element 6 made of magnetic material is of spherical shape, while the stator element 7 made of magnetic material is of cylindrical shape. The cylindrical shape is advantageous because it facilitates the setting into place of the elements made of magnetic material in the rotary assembly, in particular the aligning of the two elements and the adjusting of the determined distance M between the elements made of magnetic material for which details will be provided in the rest of the present text. The rotor and stator magnetic elements are such as defined hereinabove.

The rotor magnetic element 6 is housed in a cavity 16 provided for this purpose in the structure of the rotor 2. The cavity 16 is formed from a lateral wall 17 that extends around the axis A of the rotor 2 parallel to the latter, and is extended by tightening at the upper surface 22 of the air gap, and by a bottom 18 perpendicular to the lateral wall 17. The lateral wall 17 and the bottom 18 of the cavity 16 are suitable for retaining the rotor 6 magnetic element in a fixed position with respect to the rotor 2 itself.

The stator magnetic element 7 is housed in a cavity 19 provided for this purpose in the structure of the stator 3, at the functional portion 14 of the stator 3 housed in the rotor air gap 13. The cavity 19 of the stator 3 advantageously has a similar structure and a function that is similar to that of the rotor, with a lateral wall 20 closed by a bottom 21. Due to the cylindrical shape of the stator magnetic element 7, the lateral wall is extended by abutments 15 that partially close the cavity at the upper surface 24 of the stator.

In accordance with the embodiment shown in FIG. 2, the elements made of magnetic material of the rotor and of the stator are of spherical shape.

The magnetic bearing is preferably a passive magnetic bearing. This can be a magnetic bearing with permanent magnets or a magnetic bearing with variable reluctance.

When one of the rotor and stator magnetic materials is a magnet, for example the rotor magnetic material, the rotor magnet 6 generates a magnetic field and is configured to attract the stator magnetic element 7 when the magnetic field thereof interacts with the latter. The rotor 6 magnet and the stator 7 magnetic material form magnetic dipoles 8, 9 preferably substantially aligned together along the axis A such as shown by the corresponding arrows in FIGS. 1 and 2. Due to the relative proximity of the rotor 2 and of the stator 3 within the rotary assembly 1, and the orientation of the magnetic dipoles, the magnetic field of the rotor 6 magnet interacts with the stator magnetic element 7. Then, the stator magnetic element 7 is magnetised by the rotor 6 magnet and attracted to the latter. Given that the stator magnet is fixed, this attraction generates a corresponding attraction of the rotor 6 magnet to the stator magnetic element 7, which results in a return force that tends to retain the rotor in the axis of rotation thereof. This return force is shown in FIG. 3A which diagrams the positioning of the rotor and stator magnetic elements in a stable position. The return force applied on the rotor is shown by the arrow referenced as $F_R$ and is axially oriented downwards.

When the rotor and stator magnetic materials are magnets, they both generate a magnetic field and are configured to mutually attract each other when their magnetic fields interact with each other. They form magnetic dipoles 8, 9, preferably substantially aligned with each other along the axis A such as shown by the corresponding arrows in FIGS. 1 and 2. The magnetic dipoles 8, 9 are oriented in the same direction, here from the bottom to the top of the axis A. Due to the relative proximity of the rotor 2 and of the stator 3 within the rotary assembly 1, and the orientation of the magnetic dipoles, the magnetic fields of the rotor and stator 6, 7 magnets interact with each other and the rotor and stator 6, 7 magnets attract each other mutually. Given that the stator magnet is fixed, these interactions result in a return force that tends to retain the rotor in the axis of rotation thereof. This return force is shown in FIG. 3A.

Despite the attraction of the rotor and stator magnetic elements 6, 7 to each other, given that the stator 3 is fixed and that the rotor 2 is axially retained by the axial retaining means 4, the upper surface 22 of the air gap 13 of the rotor in the vicinity of the rotor 6 magnet and the upper surface 24 of the stator functional portion 14 in the vicinity of the stator 7 magnet, remain facing each other and axially separated by a distance $D_1$.

To this distance $D_1$ corresponds a distance $D_2$ between the lower surface 23 of the air gap 13 of the rotor and the lower surface 25 of the stator functional portion 14. It is understood that the distances $D_1$ and $D_2$ may vary according to the positioning of the stator 3 in the air gap 13 of the rotor 2, with the increase in one of these distances causing an equal decrease in the other distance and vice versa. The stator 3 is separated from the intermediate portion 12 of the rotor 2 by a distance $D_3$ in order to prevent friction of the rotor 2 against the stator 3.

The rotor and stator magnetic elements 6, 7 are separated from each other by a determined non-zero distance M. In FIGS. 1 and 2, the magnetic elements 6, 7 are advantageously arranged in the rotary assembly 1 so as to be flush at the upper surfaces 22, 24 facing the rotor and stator respectively, and this so as to maximise the magnetic interactions between them. In this arrangement, the distance M is then substantially equal to the distance D1. It is however possible to provide other arrangements of the magnetic elements 6, 7 in the structure of the rotor and of the stator respectively in order to adjust their magnetic interactions.

In accordance with what has just been described, when the rotary assembly 1 is in a stable position, and for a predetermined axial distance M between the magnetic elements, the return force is at a maximum.

When the rotor 2 rotates, the latter is able to be misaligned, i.e. come out of its axis A of rotation, and the rotary assembly 1 is able to come out of its stable position. The misalignment of the rotor 2 results in that the rotor and stator magnetic elements are no longer facing each other, and in particular are no longer aligned where applicable, according to the axis A. The magnetic dipoles 8, 9 of rotor and/or stator 6, 7 magnetic element magnets are no longer aligned together and with the axis A.

This configuration is shown in FIG. 3B. The axial component $F_{RA}$ of the return force $F_R$ decreases benefitting a radial component $F_{RR}$ oriented towards the axis of rotation A and which tends to return the rotor 2 in the axis of rotation A thereof, in a stable position.

In addition, given that the distance M that separates the magnetic elements 6, 7 is greater than in the stable position, the interactions of the magnetic fields of the magnetic elements 6, 7 decrease. The return force is then weaker than in the stable position, and the rotary assembly 1 is in an unstable position which tends to return to the balanced position thereof.

Then, the return force is at a maximum when the rotary assembly 1 is in a stable position and the rotor 2 is aligned with the axis of rotation A thereof, and decreases with the misalignment of the rotor 2. This involves increased stability of the rotor 2 during the rotation thereof compared to magnetic assemblies provided with bearings with toroidal magnets of the state of the art.

Figure 4A:
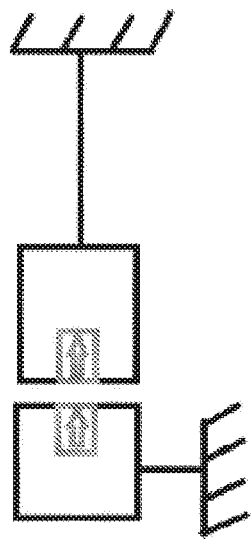
FIGS. 4A, 4B, and 4C, schematic layouts showing the differences in behaviour of the rotary assembly according to whether the geometry of the elements made of magnetic material is spherical or non-spherical.
Figure 4B:
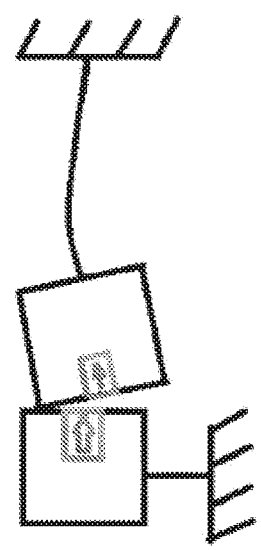
Figure 4C:
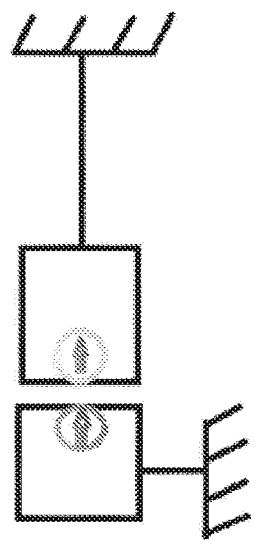

Returning to the rotor and stator magnetic elements 6, 7, at least one of the latter is advantageously of spherical shape. The shape of the magnetic elements influences the possibilities for adjusting the distance M that separates them. In reference to FIGS. 4A-C, it is indeed observed that a spherical geometry makes it possible to further minimise the distance M when the rotary assembly is in a stable position, compared to another non-spherical geometry. Indeed, in the case of a non-spherical geometry, such as for example cylindrical in reference to FIGS. 4A and 4B which show the case where the two magnetic elements 6 and 7 are cylindrical, a distance M that is too low induces a risk of misalignment of the rotor in rotation and blocking of the bearing. On the contrary, there is no risk of misalignment of the rotor when at least one of the magnetic elements of the rotor and of the stator 6, 7 is spherical, as shown in FIG. 4C in the case where the two magnetic elements 6 and 7 are spherical. Then, the magnetic interactions between the magnetic elements 6, 7 are maximised regardless of their relative position in relation to one another, which thus makes it possible to maximise the return force of the rotor.

According to a preferred embodiment of the invention, the rotor and stator elements comprise spherical magnets.

Returning to the structure of the rotor 2, when the latter is rotating around the axis A thereof, the intermediate portion 12 abuts against the stator 3, which limits the rotation amplitude thereof. The rotor 2 therefore describes an incomplete circle during a rotation around the axis A thereof. With two intermediate portions 12, the rotor 2 describes an angle slightly less than 180° when it is carrying out a rotation around the axis A thereof. It is possible to design the intermediate portion 12 in such a way that the rotor 2 can describe an angle suitable for the type of apparatus in which it is intended to operate, and if needed to achieve angles close to 360°.

This incomplete rotation of the rotor is found however generally in the rotary assemblies with magnetic bearings of the state of the art that operate in torque measuring apparatuses, with the difference that, in order to carry out a complete rotation of the rotor with these known rotary assemblies, it is necessary to provide on the rotor an abutment that counters the longitudinal forces and thus generates friction. It is therefore understood that adding an abutment takes away all of the interest in using a magnetic bearing, of which one of the main objectives is precisely to allow for a rotation of the rotor by preventing friction.

Some rotary assemblies with magnetic bearings of the state of the art operate with a source of compressed, dried and de-oiled air, which substantially reduces friction. However, although it makes it possible to do without an abutment, setting up this circulation of compressed air is not practical to set up and requires in any case additional mounting and implementation efforts. The rotary assembly with a magnetic bearing of the invention makes it possible to overcome this circulation of compressed air and the associated constraints.

Figure 5:
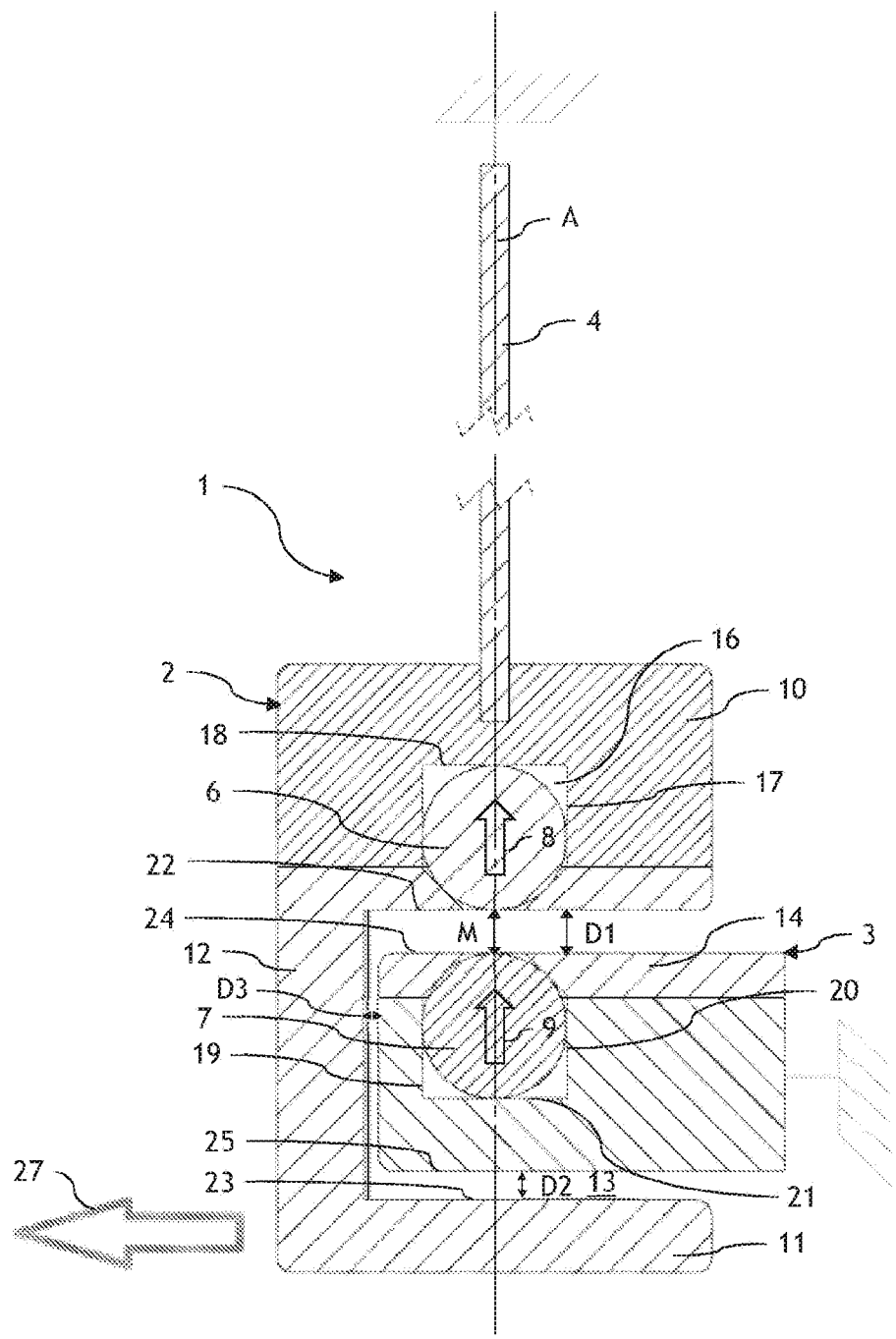
FIG. 5, a schematic layout of the rotary assembly of FIG. 1 showing a simplified disassembly of the rotor and of the stator.

The structure of the rotary assembly 1 of the invention makes it possible to simply and quickly replace a part of the rotor 2 or of the stator 3. To do this, it is sufficient to move the rotor 2 radially so as to take it out of the axis A thereof, as shown by the arrow 27 in FIG. 5, as long as the torsion bar is flexible enough to allow for this. The cavities 16, 19 and the magnetic elements 6, 7 are then accessible, and the latter can thus be removed easily from their respective cavity. New magnetic elements 6, 7 can be inserted into their cavity 16, 19, then the rotor 2 is again positioned in the axis A thereof. The rotary assembly is then ready to operate.

Moreover, the rotary assembly 1 of the invention offers the possibility of precisely and simply adjusting the return force. To do this, there are two possibilities. A first possibility consists of modifying the power of the rotor magnetic element and/or of the stator magnetic element 7, i.e. modifying the intensity of the magnetic field that they generate. From a practical standpoint, this simply entails replacing them with elements that have more substantial magnetic properties, in particular with more powerful magnets. Thus, the attractive force between the rotor and stator magnetic elements 6, 7 increases with their magnetic properties or power, and subsequently, the return force also increases.

A second possibility consists of adjusting the distance M between the rotor and stator magnetic elements 6, 7. As described hereinabove, by moving together or moving apart the magnetic elements 6, 7 from one another, the attractive force between the latter is adjusted and subsequently, the return force.

Figure 6:
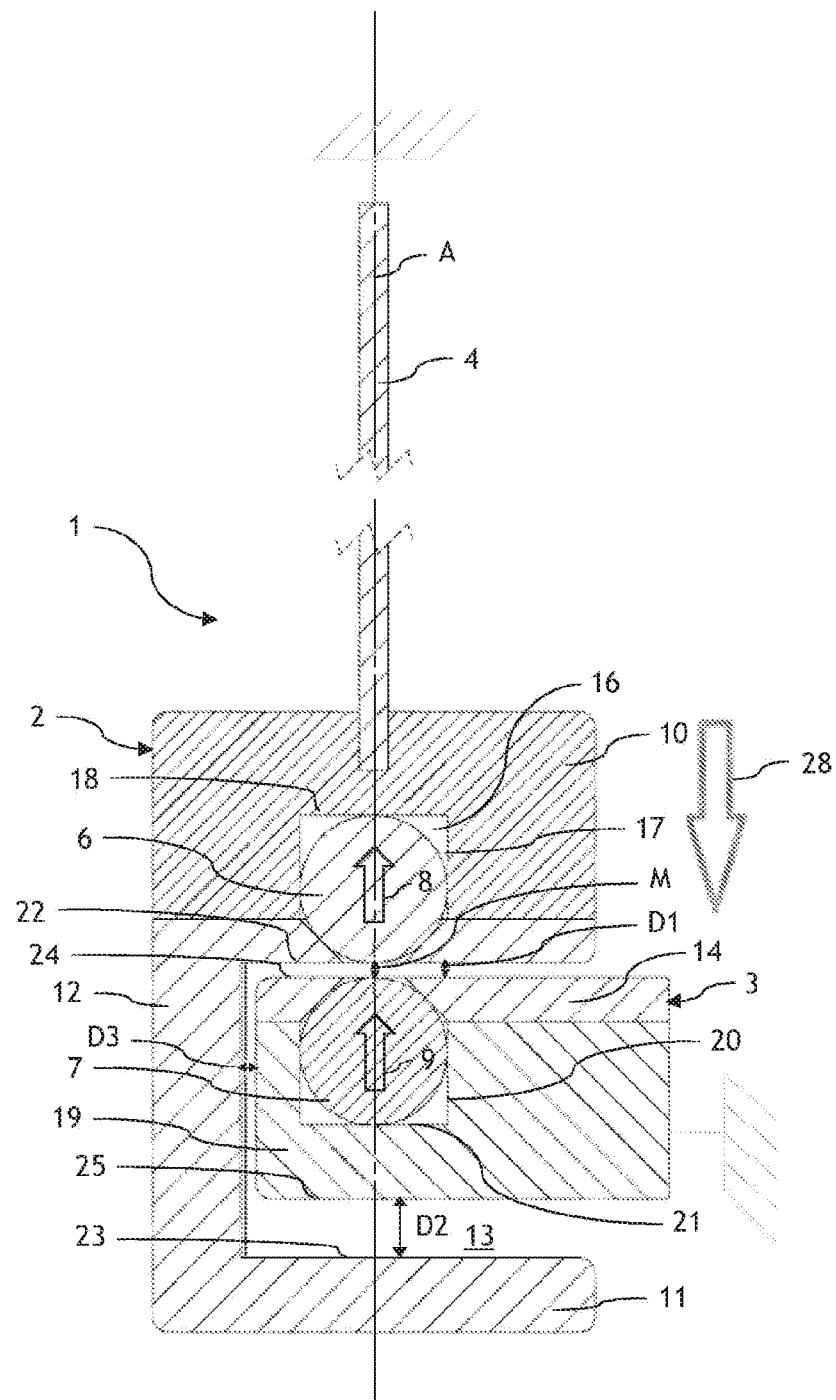
FIG. 6, a schematic layout of the rotary assembly of FIG. 1 showing a simplified adjusting of the distance between the rotor and stator magnets.

Although the replacing of the rotor and stator magnetic elements 6, 7 is facilitated with the rotary assembly described, the adjusting of the distance M is however more practical since it allows for a simple, precise and fast adjustment of the return force. If it is desired to increase the return force, it is sufficient to bring the magnetic elements 6, 7 closer together by simply moving the rotor downwards, i.e. along the axis A in a direction opposite the frame, as shown by the arrow 28 in FIG. 6. The distance $D_1$ decreases, and the distance $D_2$ increases by as much. Doing this, the stability of the rotary assembly is increased.

In comparison, with magnetic bearings with coaxial and repulsive toroidal magnets of the state of the art, adjusting the distance M is more complex since bringing rotor and stator 6, 7 magnetic elements closer together generates a risk of misalignment of the rotor 2 and of destabilisation of the magnetic bearing, given that an unstable position is approached.

In the case of an over-adjustment, where the distance $D_1$ is too short, the rotor 2 and the stator 3 can incidentally come into contact with one another and generate friction that opposes the rotation of the rotor. However, such an over-adjustment does not generate a misalignment of the rotor 2, contrary to magnetic bearings with repulsive toroidal magnets of the state of the art, but at most a slowing down of the rotation speed of the rotor 2 without damaging the rotary assembly or the torsion bar, or have a danger for an operator located nearby.

Moreover, when the rotor 2 is rotating on itself, it is subject to mechanical oscillations. These mechanical oscillations result in a movement of the rotor 2 with respect to the stator 3, within the limits of the air gap 13 of the rotor. The rotor oscillates according to a given oscillation frequency, which depends on the rotation speed thereof and mechanical characteristics of the rotary assembly. This oscillation frequency is located in a frequency spectrum that comprises a plurality of oscillation frequencies, of which in particular one or several so-called "resonance frequencies". When the oscillation frequency of the rotor corresponds to a resonance frequency, the rotor resonates, which degrades the performance of the rotary assembly and of the apparatus.

The resonance oscillation frequency of the rotor also depends on the return force of the rotor. Thus, adjusting the return force also makes it possible to adjust the resonance frequency of the rotary assembly.

Bringing the rotor and stator magnetic elements 6, 7 closer together by simply moving the rotor downwards according to the arrow 28, makes it possible to increase the return force and to move the resonance frequency to the high frequencies. Any risk of resonance when the rotor is rotating in the desired range of speed is thus avoided.

Furthermore, and in the case where the magnetic bearing is active, it is possible to dampen the oscillations with a control system adapted for this purpose.

EXAMPLE

To characterise the link between the attractive force of the rotor and stator magnetic elements, the return force resulting therefrom, and the resonance frequency, simulations are carried out with the software SolidWorks®, with magnetic elements that comprise magnets, and under the hypothesis that the oscillations of the rotor have an amplitude that is low enough for the attractive force exerted by the magnets to have a constant amplitude and be directed downwards. The rotary assembly used in these simulations substantially corresponds to that described hereinabove in accordance with FIGS. 1 to 6, the rotor has a mass of 70 grams and is connected to a frame by a torsion bar made of titanium of a diameter of 1 millimetre.

For different values of the attractive force of the rotor and stator magnets, the corresponding resonance frequencies are calculated (expressed in Hertz, with the symbol Hz). The same rotor and stator magnets are retained for all the measurements, and they are brought closer together to one another by adjusting the distance $D_1$ between the rotor and the stator.

Figure 7:
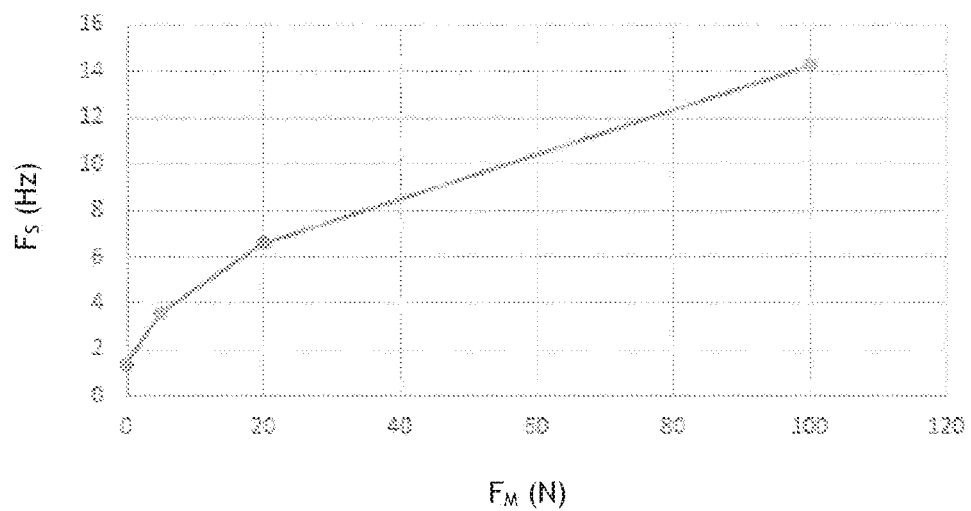
FIG. 7, a graph showing the change in the resonance frequency of the rotary assembly according to the attractive force of the rotor and stator magnets.

The results obtained are grouped together in the Table I herein below and shown in the form of a graph in FIG. 7 of which the abscissa corresponds to the attractive force of the magnets (noted as $F_M$) expressed in Newton (with symbol N) and the ordinates correspond to the resonance frequency (noted as $F_S$) expressed in Hertz (Hz).

TABLE I

| Attractive force (N) | Resonance frequency (Hz) |
|---|---|
| 0 | 1.38 |
| 5 | 3.6 |
| 20 | 6.62 |
| 100 | 14.29 |

The results show that the resonance frequency increases with the attractive force of the magnets. Thus, it is possible to adjust the resonance frequency of the rotary assembly by simply adjusting the distance $D_1$ between the rotor and the stator, then providing a speed of rotation, and therefore an oscillation frequency, of the rotor that is consequently adapted so as to prevent its oscillation frequency from corresponding to the resonance frequency.

REFERENCES

EP0983450

The invention claimed is:

1. A rotary assembly comprising:
    a stator comprising a stator element made of magnetic material,
    a rotor comprising a rotor element made of magnetic material, the rotor being rotatable with respect to the stator, the rotor being axially retained by a flexible rod configured to be attached to a frame for preventing movement of the rotor along an axis of rotation thereof so that the stator element and the rotor element are maintained at a predetermined axial distance relative to each other along the axis of rotation of the rotor, the flexible rod allowing a radial movement of the rotor,
    a magnetic bearing comprising the rotor and the stator element, at least one of the rotor and stator elements made of magnetic material being a spherical magnet, the rotor element and the stator element each forming a magnetic dipole,
    wherein the rotary assembly has a stable position in which the rotor is aligned with the axis of rotation thereof and the rotor element and the stator element are facing each other along the axis of rotation of the rotor and are separated from each other by said predetermined distance,
    wherein, when the rotary assembly is in the stable position, the magnetic dipoles of the rotor and stator elements are aligned with each other along the axis of rotation of the rotor and are oriented in a same direction so as to generate a return force which opposes the axial misalignment of said rotor,
    wherein the rotor comprises a head connected to the flexible rod, and a base arranged facing the head, so that the head and the base delimit a rotor air gap, said rotor air gap extending between the head and the base; and
    wherein the stator lies in said rotor air gap.

2. The rotary assembly of claim 1, wherein the rotor element and the stator element both comprise magnets.

3. The rotary assembly of claim 1, wherein the rotor element and the stator element are aligned along the axis of rotation of the rotor when the rotary assembly is in the stable position.

4. The rotary assembly of claim 1, wherein the rotor element and/or the stator element are permanent magnets.

5. The rotary assembly of claim 1, wherein the rotor element and/or the stator element are electromagnets.

6. The rotary assembly of claim 1,
    wherein
    the rotor comprises
    an intermediate portion which joins the head of the rotor to the base,
    and the head, the base, and the intermediate portion delimit the rotor air gap,
    the stator comprises a functional portion extending in the rotor air gap, the rotor element and the functional portion of the stator being aligned with the axis of rotation of the rotor when the rotary assembly is in the stable position.

7. The rotary assembly of claim 6, wherein the stator extends orthogonally to the axis of rotation of the rotor.

8. The rotary assembly of claim 6, wherein the distance can be adjusted by adjusting an axial position of the functional portion of the stator in the air gap of the rotor, and said distance is minimal when the rotary assembly is in the stable position.

9. The rotary assembly of claim 1, wherein the magnetic bearing is passive.

10. A rheological measurement apparatus for taking a rheology measurement, comprising a least one rotary assembly according to claim 1.

11. The rotary assembly of claim 1, wherein the return force is at a maximum for the predetermined axial distance.

12. The rotary assembly of claim 1, wherein the predetermined axial distance is a fixed distance.

13. The rotary assembly of claim 1, wherein, in the stable position, the magnetic dipoles are aligned without any offset along the rotation axis of the rotor.

14. The rotary assembly of claim 1, wherein the stator is configured to form a stop limiting a translation of the base of the rotor along the axis of rotation.

15. The rotary assembly of claim 1, wherein
    the rotor comprises an intermediate portion joining the head to the base; and
    part of the stator is surrounded by the head, the base and the intermediate portion.

16. The rotary assembly of claim 15, wherein
    the stator is attached to a frame; and
    said frame forms a stop limiting a rotation of the rotor around the axis of rotation.

17. The rotary assembly of claim 1, wherein
    the stator extends between a first side and a second side with respect to the axis of rotation;
    the first side faces the head of the rotor; and
    the second side faces the base of the rotor.

* * * * *